F. A. MAXFIELD.
Fruit-Gatherer.
No. 42,387.  Patented Apr. 19, 1864.
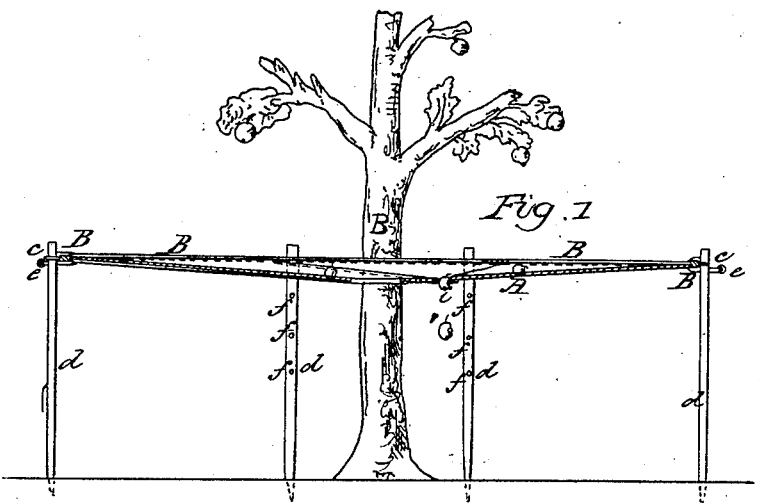
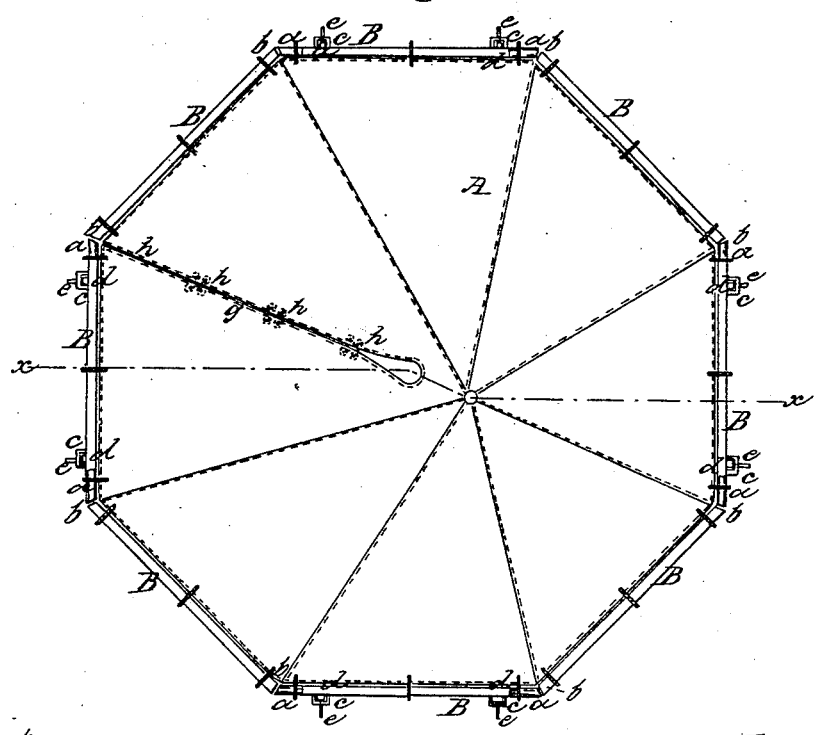
Witnesses:
J. W. Coombs
Henry Morris
Inventor:
F. A. Maxfield
per Munn & Co.
Attys.

UNITED STATES PATENT OFFICE.

F. A. MAXFIELD, OF EAST SPRING HILL, PENNSYLVANIA.

IMPROVEMENT IN FRUIT-GATHERERS.

Specification forming part of Letters Patent No. 42,387, dated April 19, 1864.

*To all whom it may concern:*

Be it known that I, F. A. MAXFIELD, of East Spring Hill, in the county of Bradford and State of Pennsylvania, have invented a new and Improved Device for Gathering Fruit; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a plan or top view of the same.

Similar letters of reference indicate corresponding parts in the two figures.

This invention relates to a new and useful device for gathering fruit, whereby the same may be shaken from the tree without injury and the labor of picking by hand avoided.

The invention consists in the employment or use of a sheet or canvas attached to rods and arranged in such a manner that it may be made to encircle the trunk of the tree and receive the fruit as it drops from the tree, the sheet or canvas being supported by stakes which are driven in the ground, and the sheet or canvas provided with a hole through which the fruit escapes into a proper receptacle or basket, as hereinafter fully described.

To enable those skilled in the art to fully understand and construct my invention, I will proceed to describe it.

A represents a sheet or canvas, which may be constructed of heavy muslin, light canvas, or other suitable fabric, made in pieces and sewed together, so as to form a polygon, as shown clearly in Fig. 2. The sides of the sheet or canvas have rods B attached to them, which may be of wood, and connected at their ends by joints formed of ferrules $a$ and dowels $b$, as shown in Fig. 2. Every alternate rod B has two staples, $c\ c$, attached to it, and these staples are fitted on stakes $d$, which are driven into the ground, the staples resting on pins $e$, which pass through any of a series of holes, $f$, in the stakes, according to the height it is desired to have the sheet or canvas. The sheet or canvas has a radial cut, $g$, made in it, which cut extends from its periphery to a point near its center, and is kept closed by hooks and eyes $h$, or other suitable means. By means of this cut $g$ the sheet or canvas A may be made to encircle the trunk of the tree, the latter being at the inner end of the cut. Near the inner end of the cut $g$ there is made a hole, $i$, of sufficient diameter to admit of the fruit passing through it. The sheet or canvas is not stretched taut, but is allowed to sag, so that the hole $i$ will be at the lowest or most depressed point, and the sheet or canvas should be of such a diameter as to catch all the fruit that may be shaken from the tree. The fruit, on striking the sheet or canvas, will naturally, on account of its gravity, pass down to the most depressed point and drop through the hole $i'$ into any proper receptacle prepared to receive it.

Thus by this simple device the labor and expense of picking the fruit are avoided, and the latter prevented from receiving any injury, as the sheet or canvas will not bruise the fruit in the least.

It is well known that many kinds of fruits cannot be gathered by shaking the trees on account of the injury they receive by striking the ground. Winter apples, for instance, all require to be picked by hand from the tree, as slight bruising would cause them to rot. My invention, however, is not only valuable as regards the obviating of the labor of picking, but will also prove an economical device in cases where fruit is not liable to be injured by falling upon the ground, as it avoids the labor of picking up the fruit. This even is an important feature.

Having thus described my invention, what I claim as new, and desire to secure by Letters Patent, is—

The sheet or canvas A, provided with a cut, $g$, and a hole, $i$, and having rods B attached to its sides, which are fitted upon and supported by stakes $d$, substantially in the manner as and for the purpose herein set forth.

F. A. MAXFIELD.

Witnesses:
JOHN HARSH,
L. H. HOGELOORN.